United States Patent
Chang et al.

(10) Patent No.: US 7,492,537 B2
(45) Date of Patent: Feb. 17, 2009

(54) FOCUS DRIVING APPARATUS WITH IMPACT RESISTANCE

(75) Inventors: Tsung-Kai Chang, Hsinchu (TW); Yi-Jung Chen, Yunlin (TW); Chin-Sung Liu, Hsinchu (TW)

(73) Assignee: TopRay Technologies, Inc., Hsinchu (TW)

( * ) Notice: Subject to any disclaimer, the term of this patent is extended or adjusted under 35 U.S.C. 154(b) by 15 days.

(21) Appl. No.: 11/866,260

(22) Filed: Oct. 2, 2007

(65) Prior Publication Data
US 2008/0278831 A1    Nov. 13, 2008

(30) Foreign Application Priority Data
May 11, 2007  (TW) ............................... 96207706 U

(51) Int. Cl.
G02C 7/02 (2006.01)

(52) U.S. Cl. .................... 359/822; 359/811; 359/819; 359/826

(58) Field of Classification Search ............... 359/824, 359/822, 811, 819, 813, 814, 823, 826, 830, 359/821
See application file for complete search history.

(56) References Cited

U.S. PATENT DOCUMENTS

| 5,719,834 | A  | * | 2/1998 | Futagawa et al. | ......... 369/44.14 |
| 6,344,936 | B1 | * | 2/2002 | Santo et al. | .................. 359/824 |
| 6,532,118 | B2 | * | 3/2003 | Ohno | .......................... 359/824 |
| 6,768,601 | B2 | * | 7/2004 | Ju | ............................... 359/824 |
| 7,028,318 | B2 | * | 4/2006 | Tajiri | ........................... 720/684 |

* cited by examiner

Primary Examiner—Hung X Dang

(57) ABSTRACT

A focus driving apparatus with impact resistance is provided, including a lens carrier seat, a fixed base, a hanging element set, and a shake-resistant element set. The lens carrier seat is for carrying a lens. The hanging element set further includes a plurality of metal wires. The shake-resistant element set includes at least a soft resilient plate. One end of the metal wires of hanging element set is fixed to the lens carrier seat, and the other end penetrates the holes on the soft and resilient plate on the fixed base and is fixed to the shake-resistant element set. The shake-resistant element set can absorb the external impact force by deformation to provide protection to the hanging element set and lens carrier seat.

3 Claims, 2 Drawing Sheets

FOCUS DRIVING APPARATUS WITH IMPACT RESISTANCE

FIELD OF THE INVENTION

The present invention generally relates to an apparatus for driving focus, and more specifically to a focus driving apparatus with impact resistance, applicable to mobile phone.

BACKGROUND OF THE INVENTION

The current mobile phones are not only used for communication, but also for additional functions, such as photography. The quality of the picture taken by mobiles phones is comparable to that by digital cameras. Some mobile phones can even take pictures with higher pixel quality than the low-end digital camera.

As the size of mobile phone is getting smaller, the internal design of a mobile phone must be even more precise, accurate and with more protections. For example, the lens module used in the mobile phone must move within a small space quickly and precisely, while maintaining stability as the mobile phone is handled with a lot of movement. It is important for the structure of the mobile phone to provide good protection to the delicate lens module.

The current way to hold the lens module is to fix the carrier seat of lens to a base so that the lens can focus. In this manner, the design must directly absorb the strong external impact or shake, such as when the mobile phone is accidentally dropped.

The protection provided in the above design is usually ineffective to the lens module. As the demands of protection to the delicate lens module increases, it is imperative to devise an effective and stable design to protect the lens module in order to meet the frequent use of picture taking functions in mobile phones.

SUMMARY OF THE INVENTION

The primary object of the present invention is to provide a focus driving apparatus with impact resistance, including a lens carrier seat, a fixed base, a hanging element set, and a shake-resistant element set. The lens carrier seat is for carrying a lens. The hanging element set further includes a plurality of metal wires. The shake-resistant element set includes at least a resilient plate.

The lens carrier seat is located inside the fixed base, and the outside of the fixed base is where the soft and resilient plate is fixed to. One end of the metal wires of hanging element set is fixed to the lens carrier seat, and the other end penetrates the holes on the soft and resilient plate on the fixed base and is fixed to the shake-resistant element set. The lens carrier seat uses the hanging element set to attach to the shake-resistant element set; therefore, the lens carrier seat is hanging and moveable.

The focus driving apparatus with impact resistance of the present invention uses a power driving apparatus to push the lens carrier seat to move. As one end of the metal wires of the hanging element set is attached to the shake-resistant element set and the other end is attached to the lens carrier seat, the lens carrier seat can move in a specific direction back and force when the power driving apparatus start to drive.

As the wires of the hanging element set are made of metal, the wires are sufficient to support the weight of the lens carrier seat. Because the metal wires are attached between the lens carrier seat and the shake-resistant element set made of soft resilient plates, the shake-resistant element set can absorb the impact when an external force is exerted on the present invention to achieve the protection of the lens module.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
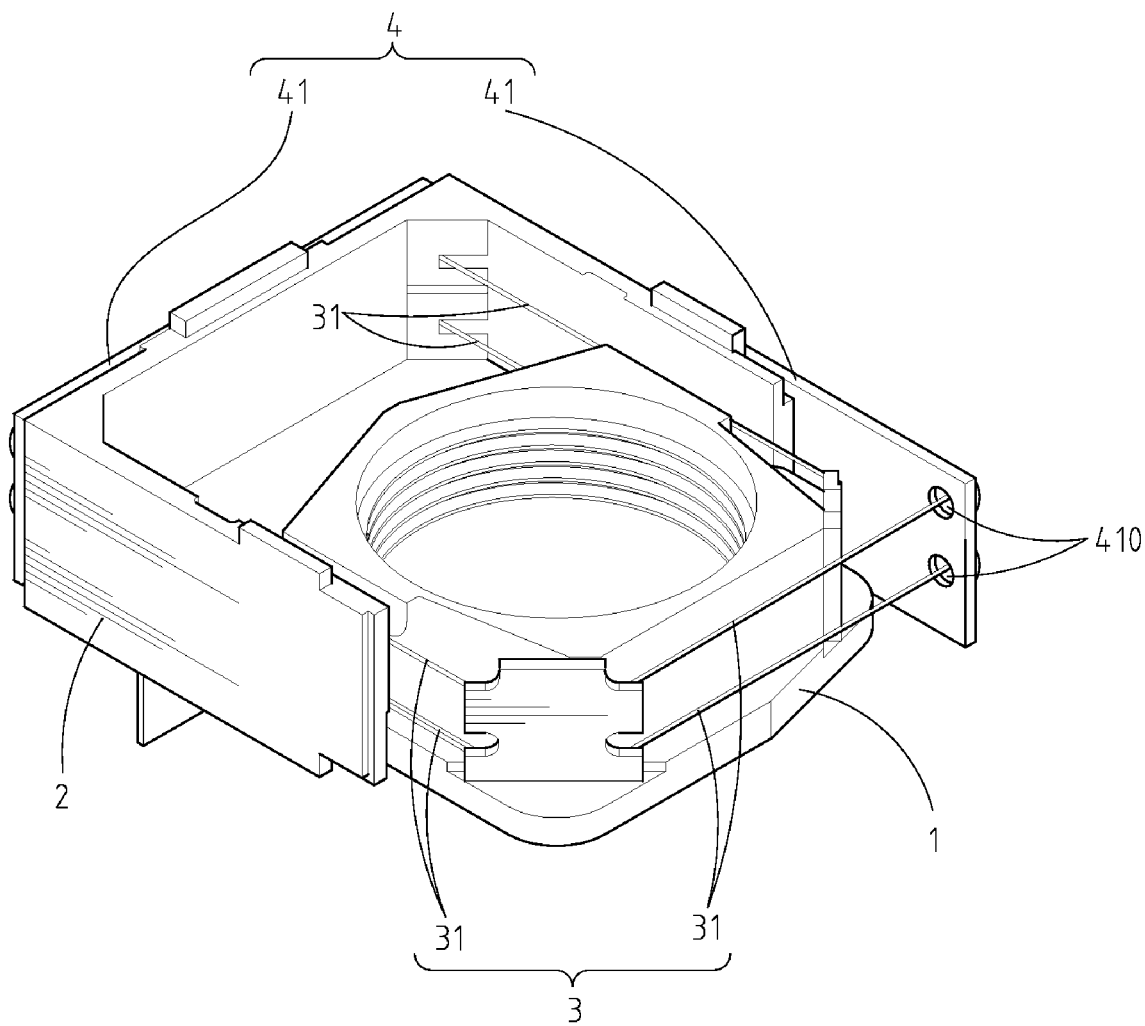
FIG. 1 shows a schematic view of the structure of the apparatus of the present invention.
Figure 2:
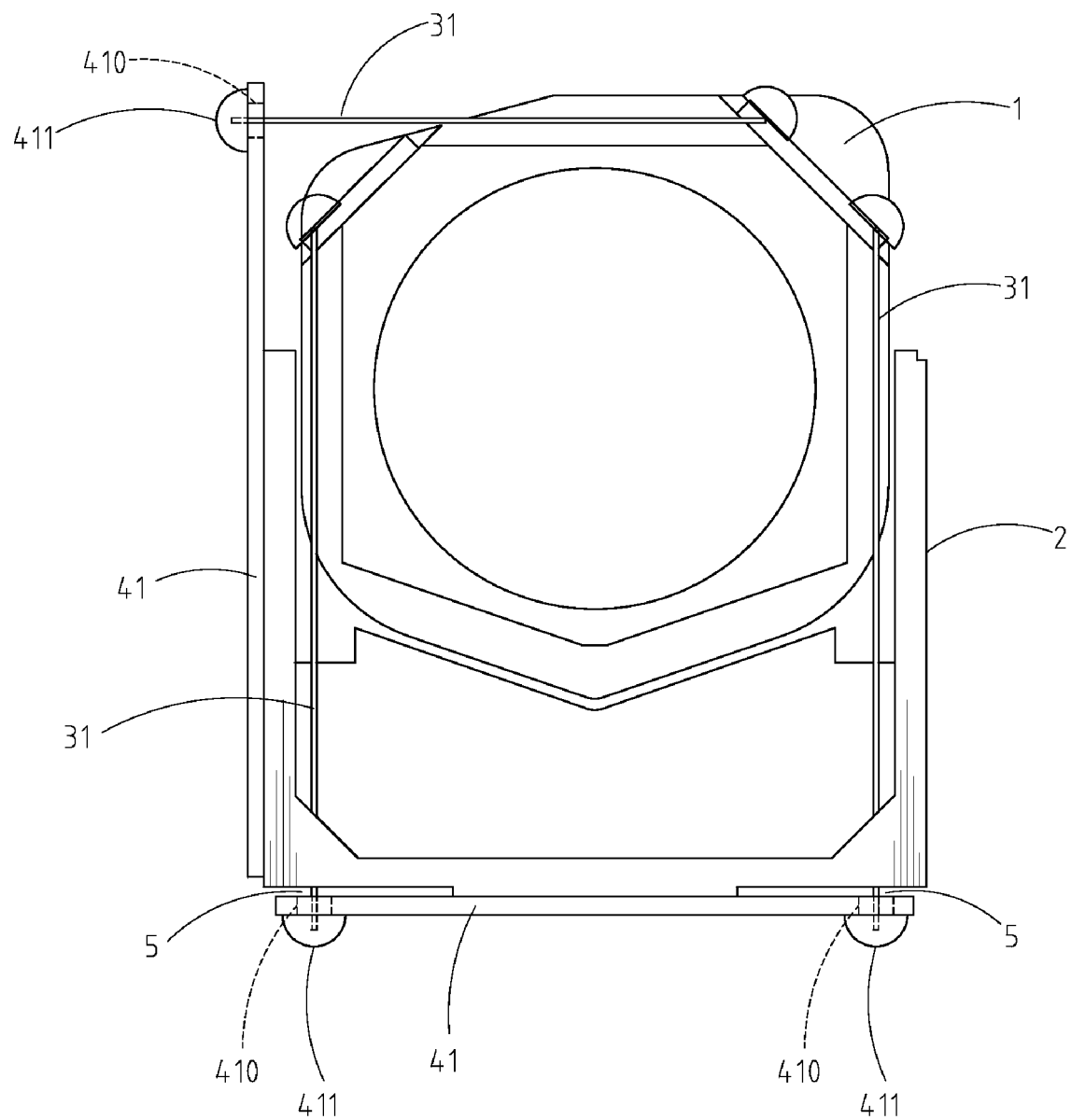
FIG. 2 shows a top view of the structure shown in FIG. 1.

Refer to FIG. 1 & FIG. 2. FIG. 1 shows a schematic view of the of the present invention, and FIG. 2 shows a top view of the present invention. A focus driving apparatus with impact resistance of the present invention includes a lens carrier seat 1, a fixed base 2, a hanging element set 3, and a shake-resistant element set 4. Lens carrier seat 1 is for holding a lens (not shown). Hanging element set 3 includes a plurality of metal wires 31. Shake-resistant element set 4 includes at least a soft resilient plate 41.

Soft resilient plate 41 is fixed to the outside of fixed base 2, and lens carrier seat 1 is located inside of fixed base 2. Lens carrier seat 1 is attached to one end of metal wires 31. The other end of metal wires 31 penetrates the holes (not shown) on soft resilient plate 41 and attached to a fixed point 411 of software resilient plate 41. Therefore, the movement of lens carrier seat 1 is regulated by hanging element set 3.

When an external force is exerted on the present invention, soft resilient plate 41, hanging element set 3 and lens carrier seat 1 are all impacted by the impact force. The soft resilient plate 41 will deform to absorb the majority of the impact to protect hanging element 3 and lens carrier seat 1 from the impact and reduce the potential damage.

Refer to FIG. 2. soft resilient plate 41 is fixed to fixed base 2, with a gap 5 between the two to prevent fixed point 411 from damage caused by the impact of soft resilient plate 41 on fixed base 2. For example, the external impact force is strong or the holding on the apparatus is steady, which may cause lens carrier seat 1 to move abnormally. The connected metal wires 31 may in turn cause sift resilient plate 41 to move. Therefore, gap 5 provides space for the deformation of soft resilient plate 41 to further protect the apparatus.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A focus driving apparatus with impact resistance, comprising:

a fixed base;

a lens carrier seat, for holding a lens;

a hanging element set, further comprising a plurality of metal wires; and a shake-resistant element set, comprising at least a soft resilient plate, with a plurality of fixed points;

wherein said shake-resistant element set being fixed on the outside of said fixed base, and said lens carrier seat being located inside said fixed base, one end of said metal wires of said hanging element set being attached to said lens carrier seat, and the other end of said metal wires of said lens carrier seat being attached to said shake-resistant element set so that said lens carrier seat forming a hanging and moveable element to perform the function of focus, said shake-resistant element set being made of soft resilient material so as to deform to absorb external impact to protect said lens carrier seat when an external impact force being exerted on.

2. The apparatus as claimed in claim 1, wherein said hanging element set is fixed to said fixed points of said shake-resistant element set.

3. The apparatus as claimed in claim 1, wherein a gap exists between said fixed base and said shake-resistant element set to provide space for deformation of said soft resilient plate.

* * * * *